US005995928A

United States Patent [19]

Nguyen et al.

[11] Patent Number: 5,995,928
[45] Date of Patent: *Nov. 30, 1999

[54] METHOD AND APPARATUS FOR CONTINUOUS SPELLING SPEECH RECOGNITION WITH EARLY IDENTIFICATION

[75] Inventors: John N. Nguyen, Belmont; Matthew T. Marx, Everett, both of Mass.

[73] Assignee: Speechworks International, Inc., Boston, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/720,554

[22] Filed: Oct. 2, 1996

[51] Int. Cl.$^6$ ........................................ G10L 5/02
[52] U.S. Cl. ............................ 704/251; 704/252
[58] Field of Search ..................... 704/231, 235, 704/241, 242, 251, 254, 257, 276, 277, 270

[56] References Cited

U.S. PATENT DOCUMENTS

| | | | |
|---|---|---|---|
| 3,816,722 | 6/1974 | Sakoe et al. | 364/728.05 |
| 3,928,724 | 12/1975 | Byram et al. | 340/172.5 |
| 4,156,868 | 5/1979 | Levinson | 704/251 |
| 4,481,593 | 11/1984 | Bahler | 704/253 |
| 4,570,232 | 2/1986 | Shikano | 704/241 |
| 4,593,157 | 6/1986 | Usdam | 179/90 |
| 4,783,803 | 11/1988 | Baker et al. | 704/252 |
| 4,852,170 | 7/1989 | Bordeaux | 704/277 |

(List continued on next page.)

OTHER PUBLICATIONS

Pallet, D. et al., 1994 Benchmark Test for the ARPA Spoken Language Program, Proc. Spoken Language Systems Technology Workshop, Jan. 22–25, 1995, Austin, Texas.

Davis, J., Let Your Fingers Do the Spelling: Implicit Disambiguation of Words Spelled with the Telephone Keypad, Journal of the American Voice I/O Society, 9:57–66 (Mar. 1991).

Marx, M. et al., "Reliable Spelling Despite Poor Spoken Letter Recognition", Proc of the American Voice I/O Society, San Jose, California, Sep. 20–22, 1994.

Phillips, M. et al., "Fast Match for Segment–Based Large Vocabulary Continuous Speech Recognition", 1994 Int. Conf. on Spoken Language Processing, Yokohama, Japan, Sep. 18–22, 1994.

Sakai, S. et al., "J–Summit: Japanese Spontaneous Speech Recognition", 3rd European Conference on Speech Communication and Technology, Sep. 21–23, 1993, Berlin, Germany.

Phillips, M. et al., "Modelling Context Dependency in Acoustic–Phonetic and Lexical Representations", Fourth DARPA Speech and Natural Language Workshop, Feb. 19–22, 1991, Pacific Grove, CA.

Zue, V. et al., "The MIT ATIS System: Dec. 1993 Progress Report", ARPA Spoken Language Technology Meeting, Princeton, New Jersey, Mar. 1994.

(List continued on next page.)

Primary Examiner—David R. Hudspeth
Assistant Examiner—Michael N. Opsasnick
Attorney, Agent, or Firm—McDermott, Will & Emery

[57] ABSTRACT

A speech recognition system capable of recognizing a word or a plurality of words based on a continuous spelling of the word(s) by a user. The system includes a speech recognition engine with a decoder running in forward mode such that the recognition engine continuously outputs an updated string of hypothesized letters based on the letters uttered by the user. The system further includes a spelling engine for comparing each string of hypothesized letters to a vocabulary list of words. The spelling engine returns a best match for the string of hypothesized letters. The system may also include an early identification unit for presenting the user with the best matching word(s) possibly before the user has completed spelling the desired word(s).

14 Claims, 4 Drawing Sheets

U.S. PATENT DOCUMENTS

| | | | |
|---|---|---|---|
| 4,866,778 | 9/1989 | Baker | 704/254 |
| 4,947,438 | 8/1990 | Paeseler | 704/252 |
| 5,005,203 | 4/1991 | Ney | 704/255 |
| 5,018,201 | 5/1991 | Sugawara | 704/252 |
| 5,027,406 | 6/1991 | Roberts et al. | 704/244 |
| 5,105,465 | 4/1992 | Koyama | 704/239 |
| 5,125,022 | 6/1992 | Hunt et al. | 379/88 |
| 5,131,043 | 7/1992 | Fujii et al. | 704/254 |
| 5,202,952 | 4/1993 | Gillick et al. | 704/200 |
| 5,204,894 | 4/1993 | Darden | 379/88 |
| 5,233,681 | 8/1993 | Bahl et al. | 704/251 |
| 5,454,063 | 9/1995 | Rossides | 704/275 |
| 5,500,920 | 3/1996 | Kupiec | 704/270 |
| 5,526,463 | 6/1996 | Gillick et al. | 395/26 |
| 5,638,425 | 6/1997 | Meador, III et al. | 379/88 |
| 5,677,990 | 10/1997 | Junqua | 704/255 |

OTHER PUBLICATIONS

Zue, V. et al., "The Summit Speech Recognition System: Phonological Modelling and Lexical Access", IEEE 1990 International Conference on Acoustics, Speech and Signal Processing, Apr. 3–6, 1990, Albuquerque, New Mexico.

Zue, V. et al., "Acoustic Segmentation and Phonetic Classification in the Summit System", Int. Conf. on Acoustics and Signal Processing, Glasgow, Scotland, May 23–26, 1989.

Fig. 3

METHOD AND APPARATUS FOR CONTINUOUS SPELLING SPEECH RECOGNITION WITH EARLY IDENTIFICATION

BACKGROUND OF THE INVENTION

A. Field of the Invention

The invention relates to speech recognition systems and, more particularly, to a system for recognizing words based on the continuous spelling thereof by a user and, when possible, for prompting the user with an early identification of the word being spelled.

B. The Prior Art

Speech recognition systems convert spoken language to a form, such as a data string, that is easily managed by a computer. Once converted to a data string, the information may then be used by the computer in a variety of ways. For example, it may be stored or output by the computer in textual form or it may be used to control a physical system. Since speech is the most common communication medium among people, significant effort has been directed at developing and improving speech recognition systems.

One commercially desirable application of speech recognition is a telephone directory response system in which the user supplies information of a restricted nature, such as the name and address of a telephone subscriber, and receives, in return, the telephone number of that subscriber. An even more complex system is a telephone ordering system in which the user supplies user-specific information (e.g., name, address, telephone number, special identification number, credit card number, etc.) as well as transaction-specific information (e.g., nature of item desired, size, color, etc.) and the system, in return, provides information to the user concerning the desired transaction (e.g., price, availability, shipping date, etc.).

The recognition of natural, unconstrained speech by a speaker-independent computer recognizer remains a complex and unsolved problem. The greatest difficulty arises from the enormous variations with which the same word or words may be pronounced by different people and even by the same person under different circumstances. This difficulty is exacerbated when there is environmental or background noise or when an inherently noisy transmission medium is being used (e.g., a telephone line). As a result, speech recognition systems often seek to simplify the recognition task in various ways. For example, they may require the speech to be noise-free (e.g., by using a good microphone), they may require the speaker to pause between words, or they may limit the vocabulary that can be understood to a small number of words.

A description of the current state-of-the-art in speech recognition systems may be found in D. Pallett, J. Fiscus, W. Fisher, J. Garofolo, B. Lund, A. Martin and M. Przybocki, 1994 Benchmark Test for the ARPA Spoken Language Program, *Proc. Spoken Language Systems Technology Workshop* Jan. 22–25, 1995, Austin, Tex. Furthermore, an example of an interactive, speaker-independent speech recognition system is the SUMMIT system being developed at the Massachusetts Institute of Technology. This system is described in Zue, V., Seneff, S., Polifroni, J., Phillips, M., Pao, C., Goddeau, D., Glass, J., and Brill, E. "The MIT ATIS System: December 1993 Progress Report," Proc. ARPA *human Language Technology Workshop*, Princeton, N.J., March 1994, among other papers. Although still unable to recognize natural, unconstrained speech, as mentioned above, commercial adaptations of these research systems and other commercially available systems have attained a level of performance that makes certain general-use applications feasible.

Since present speech recognizers, especially user-independent systems, a re unable to recognize every word being spoken, it is desirable for such systems to employ some type of fall-back mode or procedure for those situations in which the recognizer fails to identify a given word or words. These fall-back procedures, moreover, must be highly accurate. Otherwise, the user, who has already encountered a misrecognition or non-recognition by the system , m ay become sufficiently frustrated as to terminate his or her interaction with the system.

For speech recognition systems that are accessed over the telephone, one such fall-back procedure is to instruct the user to spell the desired word using the keys of a touch-tone telephone. Each key typically represents three possible letter choices. To distinguish between the various letters assigned to each key, the user may be instructed to press two keys for each letter. For example, to select the letter "A" which is the first letter listed on the numeral "2" key, the user would press the "2" key to identify the letter group desired and then the "1" key to identify the position within the letter group of the desired letter. Although such systems are eventually able to recognize most words, the procedure is cumbersome and time-consuming. A significant improvement to this approach is described in J. Davis Let Your fingers Do The Spelling: Implicit Disambiguation of Words Spelled With The Telephone Keypad *Journal of the American Voice I/O Society* 9:57–66 (March 1991). In this system, the user presses one key per letter and the system keeps track of all possible letter sequences represented by the succession of single keystrokes (each of which may represent any of three letter s). Each possible letter sequence generated by the series of keystrokes is compared against a master list of allowed words stored in the system. Despite the large number of letter sequences, the system is typically able to match the keystrokes to a unique word in the list.

The system disclosed by Davis also provides for early identification. Early identification is the selection of a word for presentation to the user before the user has entered all of the letters of the word. That is, a word is identified by the system and acted upon as soon as the sequence of keystrokes eliminates all but one possibility, even if the word has not yet been completely spelled by the user. Such systems provide improved response time and performance, by not requiring the complete spelling of every word.

Nevertheless, there are several disadvantages to spelling an unrecognized or misrecognized word via the keys of a touch-tone telephone. First, such a system obviously relies on a telephone keypad that is accessible to the user and connected to the system. Thus, the system has limited applicability. Second, it is disrupting to the user to begin voice interaction with a computer system and then switch to touch key entry. Also, since most users have not memorized the location of each letter on a touch-tone keypad and since certain letters are missing, it is awkward and time-consuming to spell in this fashion. It would be more desirable for the user to speak to the system than use the touch keys of a telephone.

Spoken letter recognition by a computer, however, is a difficult problem to solve for several reasons. First, many letters, such as those comprising the "E-set" (i.e., B, C, D, E, G, P, T, V and Z) are often confused with one another. Furthermore, on the telephone, the speech signal is often degraded by bandpass filtering and the quality of some telephone components, causing additional confusion between letters such as "S" and "F". In addition, if the letters are spoken continuously, the boundaries between the end of one letter and the beginning of the next are not readily apparent, causing two possible problems. First, confusion among letter sequences may occur (e.g., A J versus H A). Second, the recognizer may erroneously insert and delete letters in its hypothesis, thereby detecting the wrong number of spoken letters and making recognition even more difficult. Since the prior art speech recognition systems are unable to overcome these problems, they are not sufficiently accurate for use as a fallback procedure.

A "discrete-spoken" spelling system that separately prompts the user to speak each letter of the unrecognized or misrecognized word (e.g., "state first letter", "state second letter", etc.) is described in Marx, M. (co-applicant herein) and Schmandt, C. "Reliable Spelling Despite Poor Spoken Letter Recognition" *Proc. of the American Voice I/O Society*, San Jose, Calif., Sep. 20–22, 1994. By prompting the user for each letter, this approach avoids any confusion over how many letters were spoken by the user. In addition, the discrete-spelling system can identify and process each spoken letter separately, potentially resulting in greater recognition accuracy as compared to a continuous spelling system.

The discrete-spoken spelling recognition system disclosed by Marx and Schmandt also incorporates the implicit disambiguation and early identification features of the touch-tone system described by Davis. As in the touch-tone system, the discrete-spoken spelling recognition system keeps track of all possible letter sequences while the user continues to spell the desired word(s) by stating each letter. Similarly, each letter sequence is compared with a list of allowable words and the system identifies the spelled word once the list is narrowed to only one possibility. This occurs even if the user has not yet spelled the word(s) to completion. Recall that in the touch-tone system, ambiguity arises from having three possible letters for each key. In the speech recognition system, the ambiguity arises from misrecognition of the individual letters by the recognizer employed in the system. That is, one letter may be confused with another (e.g., M for N).

As part of the development of the discrete-spoken spelling recognition system, a list of likely misrecognitions between letters was developed for each letter by running the speech recognition engine on various spoken examples of each letter (e.g., different speakers, different accents, etc.). The list thus provides a set of possible letters that may have been spoken by the user for each letter hypothesized by the speech recognition engine. For example, if the recognition engine returns a "v", the list indicates that the user might have said "b", "d", "e", "p", "v" or "z". This set of possible letters is then used by the disambiguation aspect of the system to generate all possible letter sequences for comparison to the list of allowable words. The Marx and Schmandt system is thus able to provide a high level of accuracy, despite errors made by the speech recognition engine.

Nonetheless, discrete-spoken spelling systems, such as the one described above, have certain limitations. For example, because the user must wait for the system to prompt him or her for each letter, the system appears slow and time-consuming to the user. In sales-oriented and other voice recognition systems, it is extremely important that the system appear quick to the user. Indeed, a system that seems time-consuming or slow may be avoided by a user, possibly resulting in lost sales. In addition, if a user were to provide two letters despite being prompted for only one or if the recognition engine so misidentifies a single letter that the corresponding set of possible letters does not include the actual letter spoken, then the system will not identify the correct word(s). The present invention is directed, in part, to solving these limitations by providing a highly accurate computer system for the recognition of continuously spoken spelling.

SUMMARY OF THE INVENTION

A. Objects of the Invention

Accordingly, it is an object of the invention to provide an improved speech recognition system.

A further object of the invention is to provide an improved speech recognition system which permits a user to continuously spell an otherwise unrecognized word(s).

Still a further object of the invention is to provide an improved speech recognition system which can recognize a continuously spelled word(s) in real time.

Yet another object of the invention is to provide an improved speech recognition system which provides early identification of a continuously spelled word(s).

Still a further object of the invention is to provide a speech recognition system capable of recognizing a continuously spelled word(s) which is easily adapted to a variety of contexts each employing different vocabularies that may be on the order of thousands of words and greater.

B. Brief Description of the Invention

In accordance with the present invention, the system is capable of recognizing a word or several words located within the system's vocabulary based upon a continuous spelling of that word or words by a user. The system, moreover, may be implemented as a subprocess or subsystem within a more general-purpose speech recognition system. Briefly, the system includes a speech recognition engine which periodically issues an updated string of hypothesized letters as the user spells the desired word(s). The letter strings, which may contain errors such as misrecognitions, insertions and deletions, are then provided to a novel spelling engine that repeatedly compares them to a given vocabulary list until a best match is obtained. More specifically, the spelling engine preferably performs a dynamic programming match between each hypothesized string received from the speech recognition engine and the words in the vocabulary. When a match satisfying certain set criteria is found, the matched word is preferably identified and presented to the user, even if the word has not yet been spelled to completion.

In performing the dynamic programming match, the spelling engine utilizes a unique confusability matrix that sets forth the potential confusability between each pair of letters in the vocabulary and a table of transition costs representing the likelihood that the speech recognition engine inserted or deleted letters in the hypothesis. The spelling engine, via a dynamic programming algorithm, calculates a "score" for each word in the vocabulary as compared to the current sequence of hypothesized letters received from the recognition engine. The score reflects the likelihood that the current hypothesized string of letters matches a particular word or words in the vocabulary given the fact that the hypothesis may contain errors. For example, a high score may indicate a likely match between the sequence and a given vocabulary word, whereas a low score indicates an unlikely match. This process of scoring each vocabulary word against the string of letters is repeated as the spelling engine continuously receives updated letter sequences from the recognition engine. As soon as the score for a particular sequence of hypothesized letters and a given vocabulary word satisfies the predefined criteria, early identification may be performed by the system. That is, the system preferably activates a reply generator to interrupt the user during the spelling process and present him or her with the best matching word. As a result, it is often unnecessary for the user to spell the entire word before it is recognized by the system.

The speech recognition engine may be a segment-based recognition engine such as the SUMMIT system or any other commercial or research speech recognition engine which can output a hypothesis of partial spellings as a user speaks. The SUMMIT speech recognition engine first delineates the frequency domain speech signal into segments that represent individual speech sounds or phones. These segments are then classified using a segment-based feature extraction process so that a lattice of probable phones is produced. Each lattice is then presented to a decoder which determines the "best" path through the lattice thereby identifying the best choice of letter(s) for that lattice of phones. TIo determine the best path through the lattice and hence the best letter(s), the decoder preferably draws upon a lexicon of letter networks and a language model.

Importantly, the decoder of the speech recognition engine, whether it be the SUMMIT or some other commercial or research engine, is programmed to operate initially in "forward mode". That is, the algorithm used by the decoder, which may be the Viterbi algorithm, is run in the forward direction to find the best match between acoustic information received from the speaker and the vocabulary words stored in the system. In conventional operation, speech recognition engines typically perform the matching process in forward mode until the entire utterance has been received. At this point, the conventional recognition engine performs a "backward-pass" on the phone lattice before outputting its hypothesis for what was said. During the backward pass, moreover, the recognition engine may employ a second search algorithm, such as the A* algorithm, and use the results obtained from the forward pass as estimates of the path scores. This additional backward-pass step has been shown to improve the accuracy of the recognizer, in part, because an enhanced language model may be used as compared to the model used during the forward pass. Specifically, speech recognition engines denote where the user has stopped speaking, which may occur at the end of a word, phrase or sentence. The end of speech designation is then used to delineate groups of segments for analysis by the decoder. Using various language models and lexicons, the decoder is then able to analyze the group of segments by conducting a backward-pass and arrive at a best match, typically with very good results.

Since an object of the present invention is to provide a system capable of providing early identification, it is not practical for the speech recognition engine to wait for the end of speech to occur before outputting a hypothesis. Although it may be possible to force a speech recognition engine to behave as if an end of speech occurred in the middle of an utterance, a full forward-backward run by the search algorithms for every partial hypothesis would probably consume so much system resources (e.g., processor power, memory, etc.) as to be impracticable with today's computer platforms. Consequently, the decoder of the illustrated embodiment is preferably programmed, at least initially, to analyze the input speech in a forward mode. Thus, as the user spells out the desired word, the output of the recognition engine of the present invention is a continuously updated string of hypothesized letters.

The string of hypothesized letters emitted by the recognition engine is unlikely to match directly against any word or words in the vocabulary for several reasons. First, since the speech input to the system was continuous spelling by the user, there are no clear or definite breaks between letters. Thus, it is very likely that the recognition engine may have inserted letters not pronounced by the user (e.g., outputting B and E, when just B was pronounced) or missed letters that were pronounced (e.g., outputting just H, when A and H were pronounced). Second, the recognition engine may have misidentified the letters that were spoken by the user (e.g., M for N). Indeed, the system may have misidentified every letter spoken by the user such that the hypothesized string of letters bears little resemblance whatsoever to any word in the vocabulary. Consequently, the system employs a spelling engine to obtain a "best" word match based on the hypothesized string of letters.

The spelling engine preferably includes an analysis module that compares the current string of hypothesized letters with each word in the vocabulary and generates a corresponding score indicating the likelihood of a match. More specifically, a grid correlating each word in the vocabulary with the current string of hypothesized letters may be constructed. The grid preferably includes a set of nodes each of which numerically represents the likelihood of a match between the letters of the hypothesized sequence and the letters of a vocabulary word or words (e.g., a high number for likely match and a low number for unlikely match). The grid further incorporates specific transition costs associated with moving between the various nodes of the grid. To generate these grids, the spelling engine preferably draws upon a unique confusability matrix and a transition cost table. By calculating the best path through each grid using a dynamic programming algorithm (e.g., the path resulting in the highest score) and comparing the results for each grid, the spelling engine can identify the most likely match between the sequence of hypothesized letters and a word in the vocabulary list.

The scores calculated by the analysis module may be sent to a scoring module of the spelling engine. The scoring module compares the scores calculated by the analysis module against predefined criteria. The criteria, for example, may require that the score exceeds a certain threshold value and that the score exceeds the next best score by a certain amount. If no score satisfies the predefined criteria, the spelling engine waits for the next update to the hypothesized letter string from the speech recognition engine and then recalculates the scores for each vocabulary word based on this new string of hypothesized letters. When the predefined criteria are satisfied by a particular score, the system considers itself to have a match. The system, in a preferred aspect, then performs early identification, i.e. the system presents the matching word(s) from the vocabulary list to the user for acceptance, often before the user has finished spelling the word(s). The system may present the word by means of a speech synthesizer or by means of prerecorded stored speech waveforms.

If the user has finished spelling the word and no score satisfies the predefined criteria, the system preferably reverts to the conventional operation of the speech recognition engine. Specifically, the speech recognition engine performs a backward pass on the entire utterance using additional elements of the language model. To do this, the speech recognition engine first denotes where the user has stopped speaking. The decoder, preferably employing the A* search algorithm together with previously unused grammar rules from the language model which also include the list of allowable vocabulary words, then performs a backward-pass on the phone lattice to obtain a single string of hypothesized letters. The result is a single string of letters of greater accuracy than typically obtained solely under the forward pass mode.

Alternatively, the system may operate without the above-described early identification component. In this aspect of the invention, the speech recognizer rather than analyzing each partial letter-string hypothesis as it is formed, waits for the end of speech to occur and then conducts a backward-pass on the entire utterance. When the end of speech is identified, the recognition engine completes a phonetic lattice representing the entire utterance for evaluation by the decoder which outputs a complete string of hypothesized letters. The vocabulary word that best matches the hypothesized letters is then presented to the user for acceptance.

BRIEF DESCRIPTION OF THE DRAWINGS

For a fuller understanding of the nature and objects of the invention, reference should be made to the following detailed description of the invention, read in connection with the accompanying drawings, in which:

FIG. 3 is a diagram showing a confusability matrix for use in the present invention.

DESCRIPTION OF THE PREFERRED EMBODIMENT OF THE INVENTION

Figure 1:
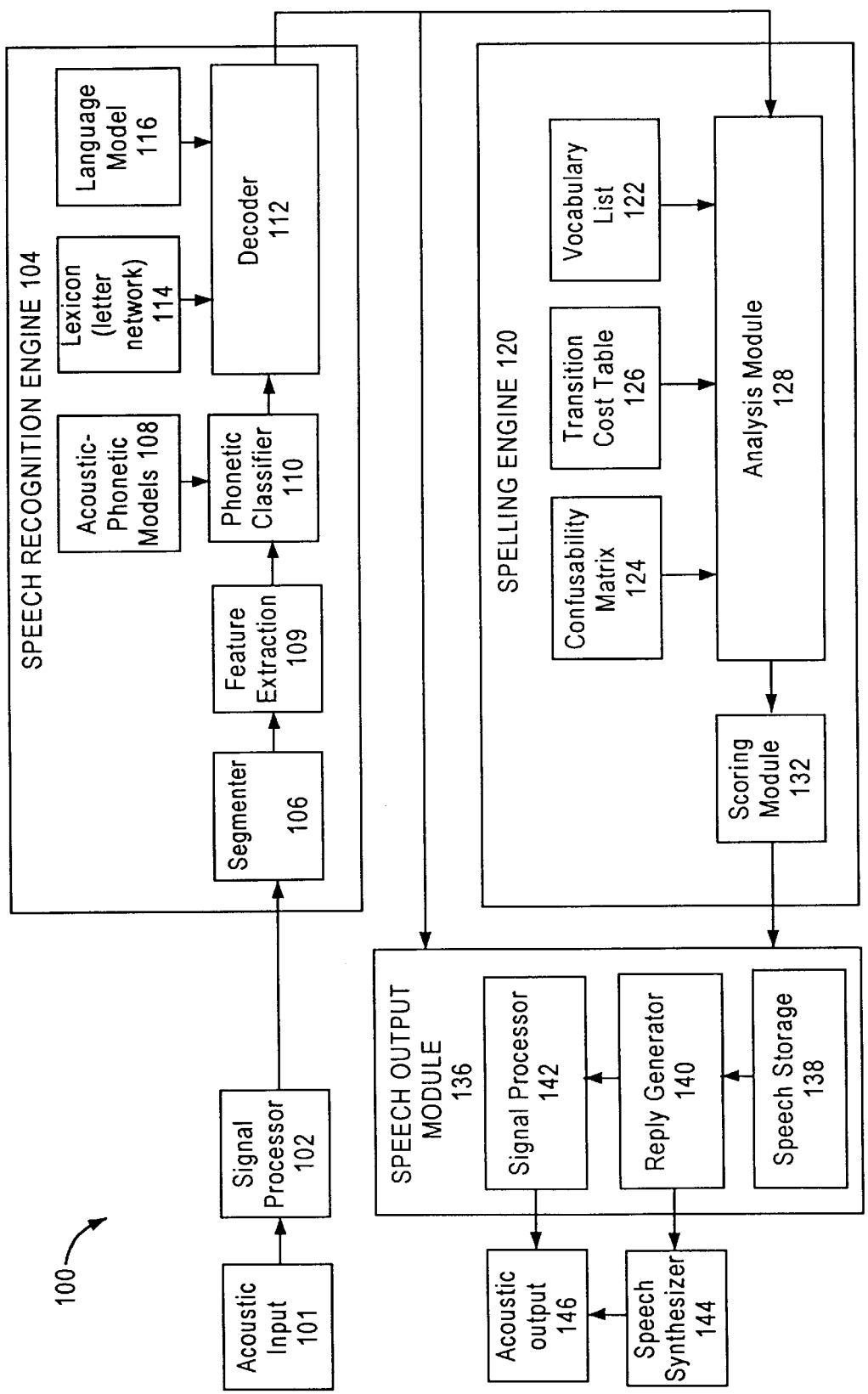
FIG. 1 is a highly schematized block diagram of a speech recognition system according to the present invention.
Figure 2:
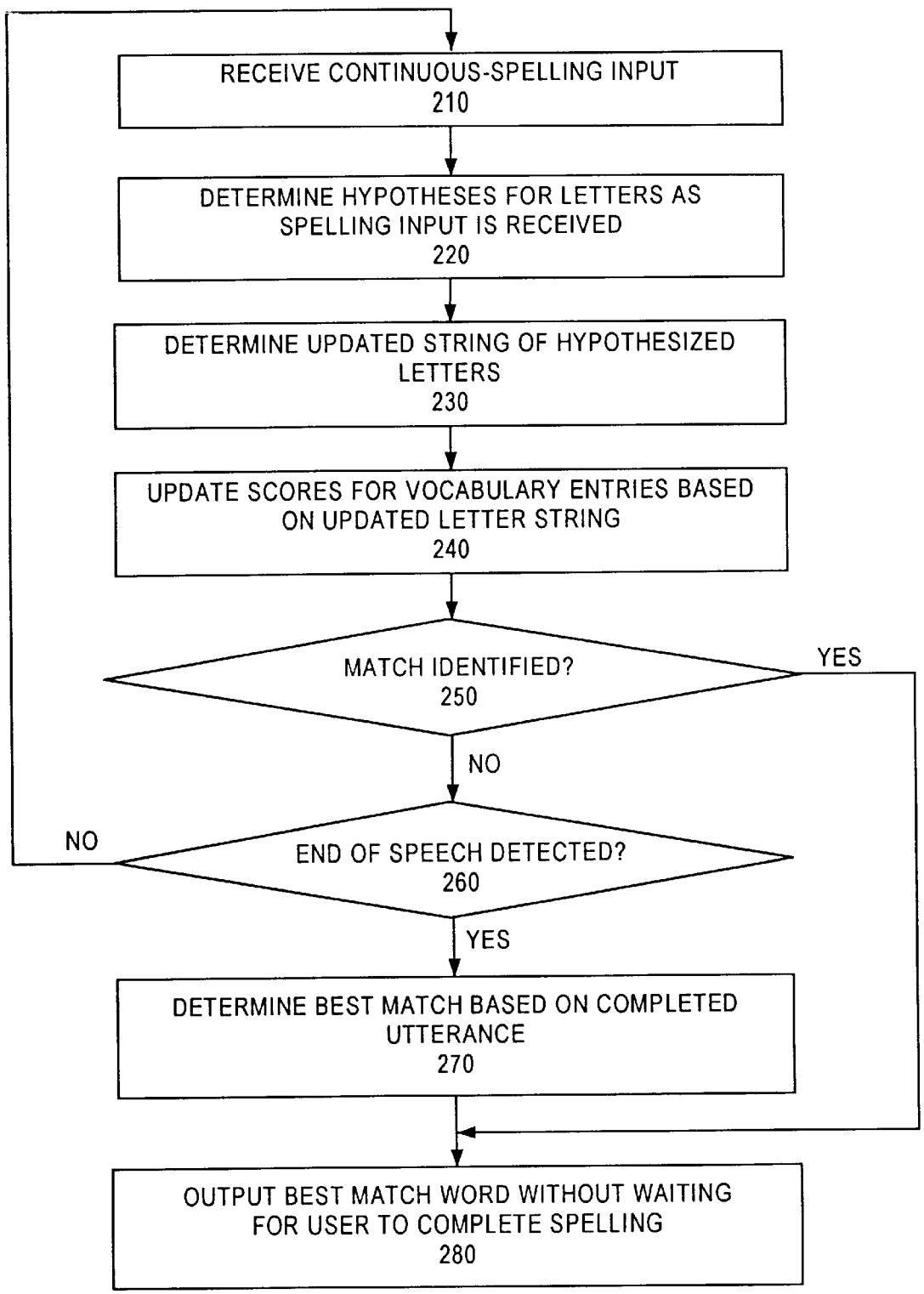
FIG. 2 is a flow diagram of a method for recognizing continuous spelling speech with early identification.

FIG. 1 illustrates generally a speech recognition system 100 of the present invention and FIG. 2 is a flow chart describing a method of speech recognition as provided by the present invention. The system 100 includes a signal processor 102 and a speech recognition engine 104. The signal processor 102 receives acoustic continuous spelling input 101 from a speaker or user, as represented by block 210 of FIG. 2, and; converts the acoustic input 101 into a form suitable for processing by the speech recognition engine 104. As described above, the acoustic input 101 is preferably a continuous string of letters representing a word or words being spelled by the user. The acoustic input 101, moreover, may be received by the system 100 over a telephone line or via a microphone (not shown). The speech recognition system 100 next determines hypotheses for letters as the acoustic input 101 is received, as represented by block 220 of FIG. 2. The signal processor 102 performs an analog-to-digital (A/D) conversion of the speech signal (e.g., 8000 samples per second and at least 8 bits per sample) and preferably filters and compresses the signal. These steps may be performed, for example, by a Dialogic Corp. printed circuit board using a CODEC chip providing 8 bit $\mu$-law compressed samples. The signal is then preferably sliced into discrete frames. Each frame may be on the order of 20 milliseconds in duration and the frames preferably overlap each other by 10 milliseconds so that all of the speech will be represented in one or more frames. The signal is then preferably uncompressed, i.e., converted back to a linear scale. Next, the signal processor 102 performs a windowing function, e.g., Hamming window, on each frame that essentially tapers the speech signal to zero at both the beginning and end of the frame thereby minimizing any discontinuities. The signal processor 102 may also perform some type of preemphasis on the time domain speech signal to reduce the amplitude range of the frequency spectrum.

The time varying signal within each frame is then preferably subject to a Fast Fourier Transform function ("FFT") to obtain a frequency domain signal. The log amplitude of the frequency signal may be warped to the "mel" frequency scale and the warped frequency function subject to a second FFT to obtain a parameter set of mel frequency cepstral coefficients ("MFCC"). Thus, the output of the signal processor 102 is preferably a sequence of n-dimension vectors, each vector representing a frame of the acoustic input. The precise steps to obtain MFCC vector representation of the speech signal, including the appropriate algorithms, are known to those skilled in the art of digital signal processing and speech recognition and thus need not be discussed in any greater detail herein.

It should be understood that any of these steps may alternatively be performed by the speech recognition engine 104 rather than a separate signal processor. It should be further understood that the speech signal may be subject to additional steps to reduce the computation power and storage space needed to analyze the speech.

The resultant signals, i.e., the MFCC vector representations, are then analyzed in a segmenter 106 to hypothesize boundaries between the frames thereby creating sub-constituents (termed "segments") of the speech input. These boundaries delineate hypothesized "phones" corresponding to phonemes. A phoneme is a symbol that designates a basic sound of the language, e.g., the sound of the letter "n", and is typically represented by enclosing it between slashes: /n/. It should be noted that a letter does not equal a phoneme. For example, the letter "W" contains many phonemes, i.e., /d ah b el y u/ (using the ARPABET transcription convention). A phone, moreover, is a symbol representing the detailed pronunciation of a phoneme and is typically enclosed between brackets, e.g., [n]. Between different speakers and sometimes even with the same speaker, a given phoneme may have many different pronunciations and hence may be represented by different phones.

The segmenter 106 may hypothesize several begin- and end-times for each phone, resulting in a "lattice" of overlapping hypothesized segments. The output of the segmenter 106 is then applied to a feature extraction component 109 of the recognition engine 104 in which a new set of l-measurements, called "features", are taken on each segment. The features are especially relevant to distinguishing phones from each other. Each segment, moreover, is preferably subject to principal component analysis of the features so that each segment may be represented by a single m-dimension vector where m≦l.

Thereafter, the segments are applied to a phonetic classifier 110. The classifier 110 considers the segments and assigns labels in the phonetic lattice. This labeled lattice represents hypothesized sequences of the various phones that are likely to match a portion of the spoken utterance and the probabilities associated with each. To assign the phonetic labels, the classifier 110 relies on detailed acoustic information within a plurality of acoustic-phonetic models 108. The acoustic-phonetic models preferably 108 contain a broad range of acoustic information compiled from large numbers of example utterances including a list of phonemes and their acoustic properties, such as typical duration, frequency content, etc. Preferably, a quick analysis of the segment using only the broad phonetic properties of the models is done first to narrow down the possibilities. The task of determining the "best" path through the phonetic lattice, hence the most likely spoken input, is performed by a decoder 112. Relying on the information contained in the lexicon 114, the decoder 112, preferably via a dynamic programming ("DP") search algorithm, identifies which path through the phonetic lattice most likely corresponds to the associated portion of the speech input. The DP algorithm may be the Viterbi algorithm performed in the forward direction. The Viterbi algorithm is well-known to those skilled in the art of speech recognition.

The lexicon 114 is basically a language resource that describes how each word in the vocabulary (in this case, letters) is pronounced. The lexicon 114 provides the rules governing how letters may be strung together and further describes how the pronunciation of a letter may change depending on the preceding and following letters.

To assist the decoder 112 in determining the best path through each phonetic lattice, the decoder 112 may also draw upon a language model 116. The language model 116 guides the decoder 112 in its search for the best match between the phonetic paths generated by classifier 110 and the letter paths traced through lexicon 114. More specifically, the language model 116 preferably includes a bigram which contains information concerning which letters are more likely to follow a given letter. For example, if the decoder 112 first hypothesizes an M, then a path through a subsequent portion of the phonetic lattice that corresponds to a "K" would be given a low weight or score, because a K is not likely to follow an M in English words. On the other hand, a path through this same portion of the lattice corresponding to an A would be given a higher score since it is more likely that the M is followed by an A. Thus, the decoder 112 finds the most likely letter or letters for a given phonetic lattice or portion thereof.

As mentioned above, conventional speech decoders typically wait for the end of speech to occur and then conduct a backward pass through a complete lattice and word network before producing a hypothesis for the input speech. The backward pass, which typically utilizes the A* search algorithm, can take advantage of a more complex, enhanced language model, including the vocabulary list(s), than the forward pass, generally resulting in greater accuracy. This approach, however, is not practical for a system, such as that disclosed herein, seeking to provide early identification of a word being continuously spelled by a user.

The decoder 112 of the present invention is thus programmed to operate, at least initially, in a forward mode. That is, the speech recognition engine 104 does not wait for the end of speech to occur before producing a hypothesis for the input speech. The decoder 112, moreover, operates on the lattice in a forward mode using a DP algorithm such as the Viterbi algorithm to calculate the best path through the lattice. More specifically, the decoder 112, via the Viterbi algorithm, preferably formulates and analyzes a two-dimensional matrix of nodes. The matrix essentially represents the given lattice as compared with a phone or plurality of phones from the lexical network 114. Each node of a matrix, moreover, represents a possible match between a phone boundary in the lattice and a phone boundary from the lexical network 114 and is assigned an associated score depending on the likelihood of the match. Thus, by connecting various nodes within a matrix beginning at a start point of the lattice and ending at an end point of the lattice, various paths through the matrix may be tested each having a different score depending on which nodes were selected. The path having the highest score is typically considered to be the best match between the phone boundaries of the given lattice and the lexical network. For each lattice formed by the phonetic classifier 110, the decoder 112 is thus able to determine the best letter or letter sequence represented by that lattice or portion thereof.

Thus, referring again to FIG. 2, as represented by block 230, and the resultant outputs of the speech recognition engine 104 are updated strings of the best letters hypothesized by the decoder 112. That is, the speech recognition engine 104 continuously analyzes the input speech while the user speaks. Moreover, as the user continues to speak, the speech recognition engine 104 is constantly receiving additional information with which to conduct its analysis. Typically, the additional information results in another letter or letters being added to the end of the previous string of hypothesized letters. Alternatively, or in addition to adding letter(s), the recognition engine 104 may change its hypothesis of the beginning letter(s) based on its hypothesis of subsequent letters. The recognition engine 104 may even revise its hypothesis based on additional speech input such that the updated string actually has fewer letters than a previous string of hypothesized letters.

Each hypothesized letter string is preferably sent to a spelling engine 120, which compares the letter string to the words of a preselected vocabulary list 122 and determines scores for each word indicating the likelihood that its matches the letter string, as represented by block 240 of FIG. 2. In addition to the vocabulary list 122, the spelling engine may contain a confusability matrix 124, a transition cost table 126, an analysis module 128 and a scoring module 132. The analysis module 128 preferably implements a DP algorithm, similar to dynamic time-warping algorithms, to search the vocabulary list 122 for the best match to the current letter string. A description of dynamic time-warping algorithms may be found in L. Rabiner and B. Juang Fundamentals of Speech Recognition (1993) at pages 204 to 241.

Preferably, the spelling engine 120 first constructs a node grid for each vocabulary word and hypothesized letter string. A node grid is basically a method of representing two sequences of letters for comparison via dynamic programming and is similar to the matrices described above. Each node on the grid, moreover, preferably represents a potential match between a hypothesized letter of the current string and a letter from the vocabulary word associated with that grid. The transition or movement from one node on the grid to a second node, moreover, has an associated cost. By tracing a path through the grid, the sequence of hypothesized letters can be matched up against the letters of the vocabulary word associated with that grid. Typically, the object which is solved via dynamic programming is to determine the highest scoring path through a node grid.

Figure 3:
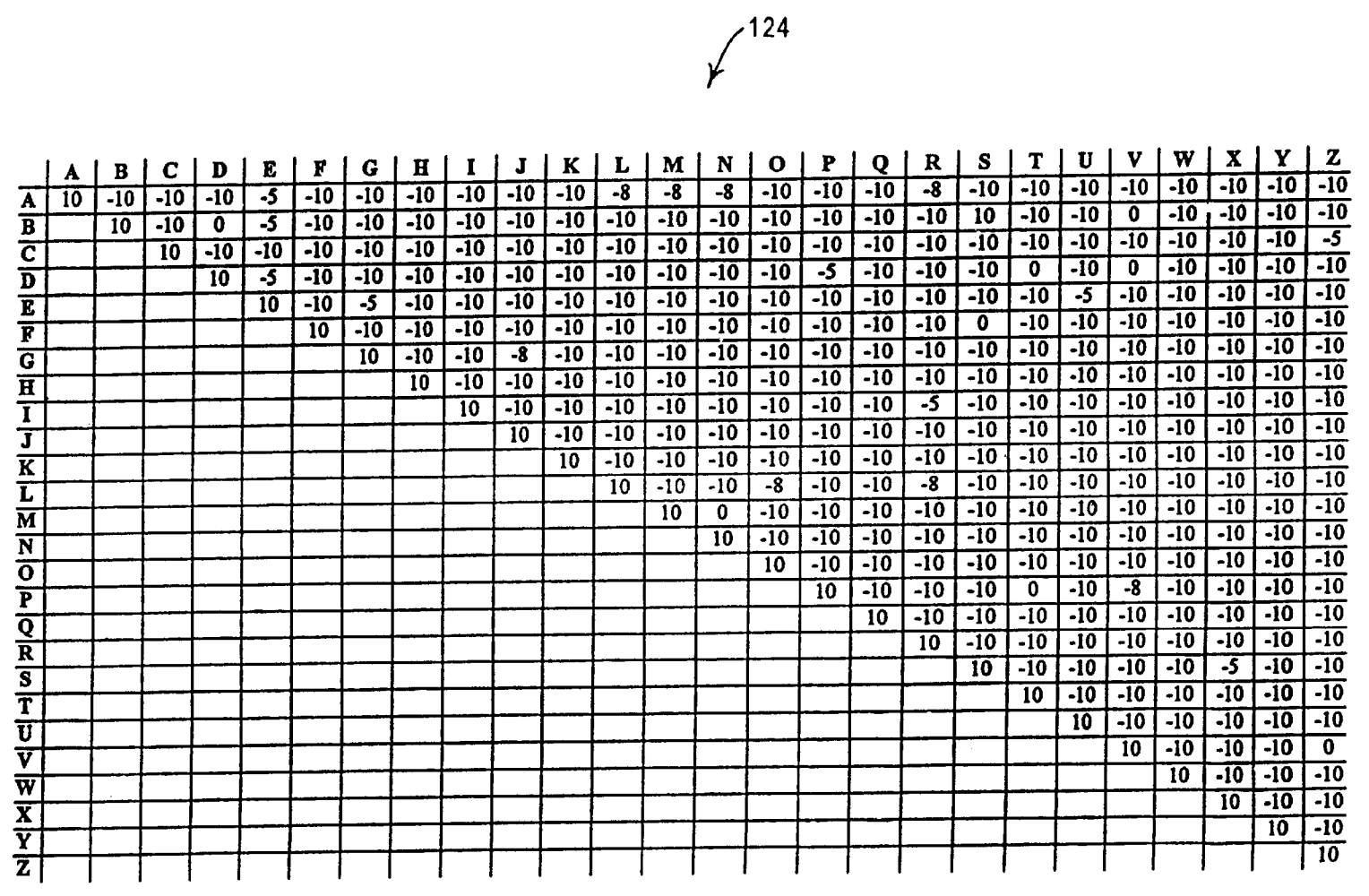

To construct the node grids, the spelling engine 120 preferably draws upon the confusability matrix 124 and the transition cost table 126 in addition to the vocabulary list 122. More specifically, the confusability matrix 124 which may be of the form shown in FIG. 3 represents the likelihood of a match between each pair of letters, i.e., the likelihood that the recognition engine 104 would hypothesize one of the letters when the other was actually spoken. Preferably, the confusability matrix 124 is arranged so that a good match (e.g., A to A) has a high score, e.g., +10, and a poor match (e.g., A to S) has a low score, e.g., −10. The scores may be derived in a number of ways such as empirical studies, knowledge-based assumptions, etc. In addition, the transition cost table 126 preferably provides for some penalty for both horizontal and vertical moves within the grids since these moves represent the deletion and insertion of letters, respectively, by the speech recognition engine 104. Diagonal moves are preferably assigned the corresponding score from the confusability matrix 124 for the associated letter pair. That is, a diagonal move to a good match between a hypothesized letter and a letter in a vocabulary word (e.g., A to A) preferably is assigned a high score (e.g., +10), whereas a diagonal move to a poor match (e.g., A to S) is assigned a low score (e.g., –10). Note that, though penalized, deletion and insertion are nonetheless allowed by the spelling engine 120.

Figure 4C:
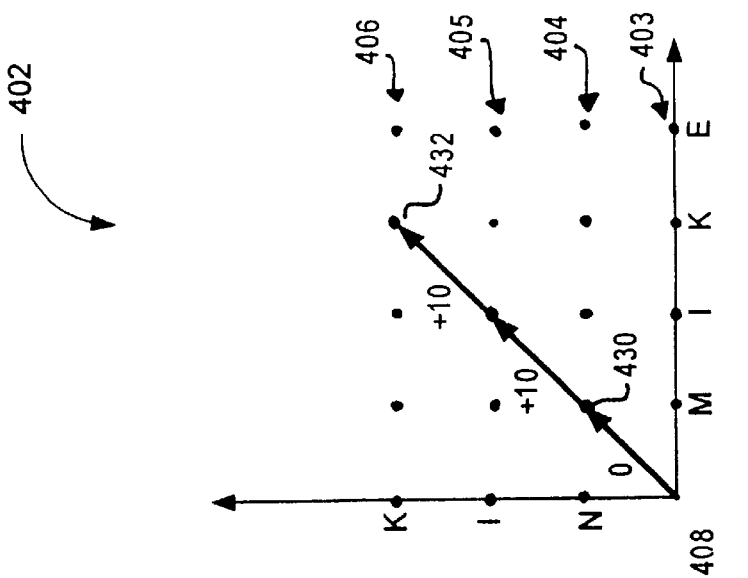
FIGS. 4A–4C are illustrations of various node charts for use by the system.
Figure 4B:
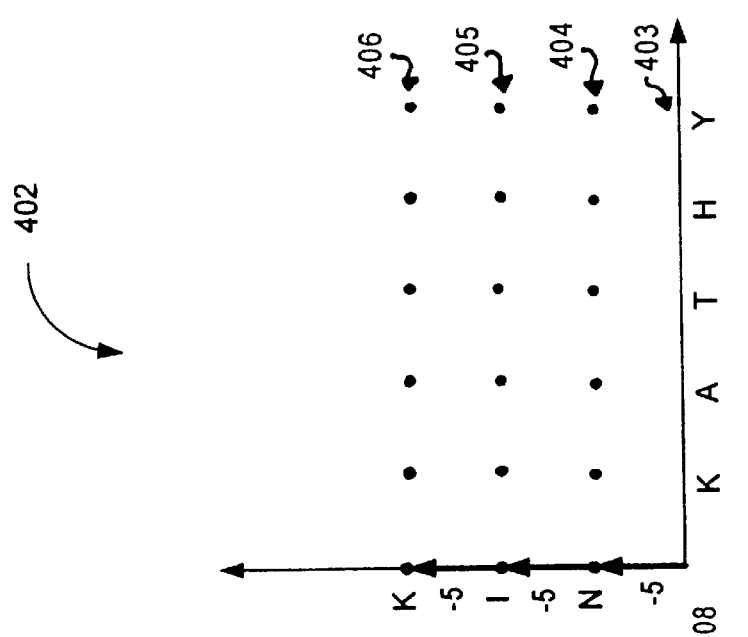
Figure 4A:
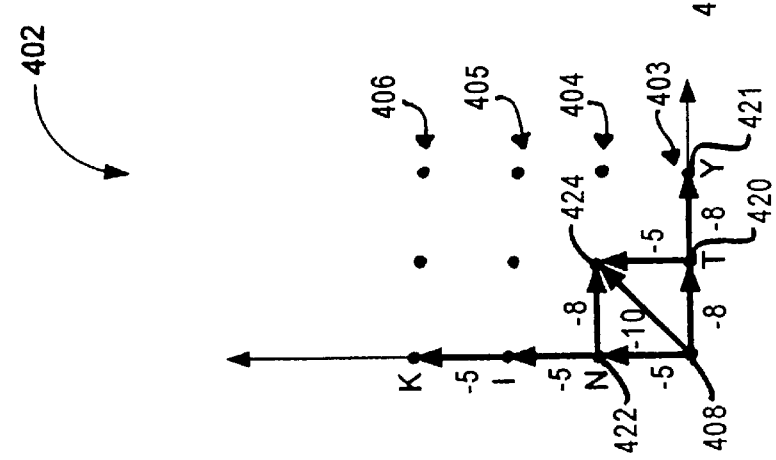

In a simplified example as shown in FIGS. 4A–4C, assume that a current hypothesized string of letters from the speech recognition engine 104 (FIG. 1) are N, I and K (although the speaker uttered "M-I-K"), and the vocabulary list 122 (FIG. 1) contains three names, e.g., Ty, Kathy and Mike. First, a separate node grid 302 is preferably constructed for each vocabulary word as shown. Each node grid 402 preferably comprises a plurality of rows 403–406 and a start node 408. The analysis module 128 (FIG. 1), via the dynamic programming algorithm, preferably determines the score associated with each path through the node grid 402 from the start node 408 to any node in the row 406 associated with the last hypothesized letter (e.g., K). Thus, the spelling engine 120 requires each letter in the hypothesis to be considered, but not necessarily each letter in the associated vocabulary words since the user may not have yet finished spelling the word(s).

Movement through the grids 402, moreover, may be subject to certain constraints. For example, horizontal movement through the grids may be constrained by allowing only horizontal moves in the direction of increasing vocabulary word length, e.g., from left to right as shown in FIGS. 4A–4C. Vertical movement may be constrained by allowing only vertical moves in the direction of increasing hypothesized letter string length, e.g., from bottom to top as shown in FIGS. 4A–4C. Similarly, diagonal moves may be constrained in a direction of both increasing vocabulary word length and increasing hypothesized letter string length, e.g., left to right and bottom to top as shown in FIGS. 4A–4C.

The analysis module 128 preferably determines the best path through each node grid 402 by analyzing each rows 403–406 in order and preserving the best score to each node. Referring to FIG. 4A, the analysis module 128 first determines the cost of arriving at each node in the first row 403. To arrive at the node associated with the letter T in the first row 403 (e.g., point 420), the only move satisfying the above constraints is a horizontal move from the start node 408. A horizontal move, moreover, is preferably associated with a low score (e.g., –8), since a horizontal move indicates that the speech recognition engine 104 missed a letter enunciated by the user. The analysis module 128 next determines the cost of arriving at the node associated with the letter "Y" in the first row 403 (e.g., point 421). Again, the only move satisfying the above constraints is a horizontal move.

After completing its analysis of the nodes within the first row 403, the analysis module 128 preferably considers the nodes of the second row 404. To move from the start node 408 to the node associated with the letter N in the second row 404 (e.g., point 422), the only move satisfying the above constraints is a vertical move. A vertical move, however, is associated with a low score (e.g., –5), since a vertical move indicates that the speech recognition engine 104 inserted a letter not enunciated by the user. To reach the node associated with the hypothesized letter "N" and the vocabulary word letter "T" (e.g., point 424) in the second row 404 of the node grid 402, several different paths may be used. The path may move vertically from point 420 at a cost of –5 or horizontally from point 422 at a cost of –8. Alternatively, the path may move diagonally from the start node 408 directly to the point 424. Since the confusability between the hypothesized letter "N" and the vocabulary letter "T", is low, the confusability score from the confusability matrix 124 (FIG. 2) for a match between N and T is low (e.g., –10). Thus, a diagonal move to arrive at point 424 is assigned a score of –10 by the spelling engine 120. The score for each new node in a node grid 402, moreover, is preferably the maximum score of the three possible transitions or moves (i.e., horizontal, vertical or diagonal), each of which is formed from the sum of the score of the previous node associated with the particular move and the transition score or the confusability score depending on the type of move used.

Referring now to FIG. 4C, since the confusability between "N" and "M" (e.g., point 430) is high, the confusability score (from the confusability matrix 124) is high (e.g., 0) indicating a good chance that the letters were confused by the speech recognition engine 104 (FIG. 1). Consequently, the score associated with a diagonal move to arrive at point 330 is high (e.g., 0). Similarly, a match between "K" and "K" (e.g., point 432) is good. Thus, the score associated with arriving at point 432 via a diagonal move, which is obtained from the confusability matrix 124 (FIG. 2) is high (e.g., +10). As shown, the score associated with a diagonal move is preferably assigned by the spelling engine 120 by looking up each letter pair in the confusability matrix 124.

By repeating this process for each node within each row 403–406, the spelling engine 120, via the dynamic programming algorithm, determines the path through the grid having the highest score. Referring to FIG. 4A, the highest score (e.g., –15) may be obtained by following a path vertically upward from the start node 408 to a point 442 in the last row 406. Similarly, the highest score for FIG. 4B (–15) may also be obtained by following a vertical path from the start node 408. For FIG. 4C, the highest score (e.g., +20) may be obtained by following a diagonal path from the start node 408 to the point 432 in the last row 406. As shown, the score for the grid 402 associated with the vocabulary word Mike is the highest (i.e., +20 versus –15). It will thus be seen that the specific scores or values stored in the confusability matrix 124 and the transition cost table 126 significantly affect the accuracy rate within the spelling engine 120. The spelling engine 120 (FIG. 1) preferably retains each of the scores determined by the analysis module 128 for subsequent analysis by the system 100.

It should be understood that rather than moving successively through each grid by row, the analysis module 128 may move column by column.

Referring again to FIG. 1, the highest score calculated by the analysis module 128 is preferably submitted to a scoring module 132. The scoring module 132 contains predefined criteria for comparison against the highest scores calculated by the spelling engine 120. For example, the criteria may require that the score exceed a certain threshold level (e.g., 30) and also surpass the next best score by a given amount (e.g., 30). These suggested values have been shown through experimentation with the system 100 to achieve a high recognition accuracy. As explained in more detail below, the predefined criteria may be static or dynamic.

If the scores calculated by the spelling engine 120, based on the current list of hypothesized letters, do not meet the predefined criteria, thus indicating no match of acceptable accuracy, then the spelling engine 120 waits for an updated hypothesis from the speech recognition engine 104 and recalculates the scores for this new string of letters. This is likely to occur early in the process when the spelling engine 120 has only a small number of "hypothesized" letters upon which to perform its analysis. Consequently, this process is preferably repeated until a score satisfying the predefined criteria of the scoring module 132 is obtained. Indeed, each time a new hypothesis is output by the speech recognition engine 104, the spelling engine 120 preferably reformulates each grid anew, because letters at the beginning of the hypothesis may have changed. To enhance the speed of the system 100, portions of the grids or subgrids (not shown) preferably corresponding to the beginning sequence of a hypothesized letter string that has remained unchanged between updates may be preserved, thereby obviating the need to wholly re-create each grid upon receipt of an updated letter string.

Once a vocabulary word having a score satisfying the criteria is identified, the vocabulary word is determined as matching the hypothesis as represented by block 250 of FIG. 2 and, and the system 100 preferably performs early identification. That is, a speech output module 136 may be engaged to interrupt the user and announce the best matching vocabulary, as represented by block 280 of FIG. 2 word. The speech output module 136 preferably includes a speech storage element 138, a reply generator 140 and a signal processor 142. In place of or in addition to the speech storage element 138, the speech output module 136 may include a speech synthesizer 144. More specifically, the speech storage element 138 preferably includes pre-recorded utterances available for playback to the user. The speech synthesizer 144 may be any of a number of research or commercial systems which can convert word strings to speech (known as "text-to-speech" systems). The utterances associated with the recognized word may be selected by the reply generator 140 from the speech storage element 138 and submitted to a second signal processor 142 which converts the utterances from a digital format to an analog format understandable by the user. If a speech synthesizer 144 is used, the reply generator 140 provides a word string to the speech synthesizer 144 representing the desired utterance and the speech synthesizer 144 directly outputs speech. The matching word or words is then presented to the user for acceptance via an acoustic output 146.

As mentioned above, the spelling engine 120 described herein is preferably implemented as a subsystem augmenting a conventional (e.g., continuous word or phrase) speech recognizer. Thus, if the user accepts the word proposed by the system 100, the conventional speech recognizer essentially resumes its previous operation. If at some other point in that process, the conventional speech recognizer is unable to recognize another word or words spoken by the user, the spelling engine 120, may once again be deployed to identify the desired word(s) based upon a continuous spelling thereof by the user.

If the user rejects the word proposed by the system 100, there are several alternate or sequential responses. First, the system 100 may propose the next best word, i.e., the word having the next highest score, to the user for acceptance. More specifically, the spelling engine 120 which preferably retains the scores for each word in the vocabulary list 122, identifies the next best choice to the speech output module 136 for playback to the user. Second, the system 100 may prompt the user to re-spell the desired word, preferably in its entirety, since it may be confusing to ask the user to begin spelling wherever he or she left off.

To improve the overall accuracy of the system 100, as represented by block 260 of FIG. 2, an end of speech is preferably denoted by the speech recognition engine 104 whenever it determines that the user has finished spelling the desired word(s) and no match has been identified that satisfies the predefined criteria. As shown by block 270 of FIG. 2, the decoder 112 in this aspect of operation is directed to conduct a backward-pass through the completed lattice, further improving the accuracy of the speech recognition engine 104. More specifically, in this aspect of the invention, the decoder 112 preferably utilizes the A* search algorithm.

During the backward pass, the decoder 112 preferably draws upon additional features of the language model 116 beyond the bigram typically used during the forward pass. For example, the decoder 112 may draw upon a set of grammar rules (not shown) incorporating the same vocabulary list(s) accessed by the spelling engine 120. These grammar rules prescribe the allowed letters later in a word within the vocabulary list(s), given letters found earlier in the word, such as Y or H if T was hypothesized previously, etc., and are generally useful only when the decoder 112 is considering the entire spelling of the desired word.

The A* search algorithm, which relies on the path costs previously determined by the Viterbi algorithm, starts at the end node of each matrix and works its way back to the start node. Moreover, since the A* search algorithm is able to keep track of the complete currently hypothesized path through the matrix, it can implement the above described grammar rules of the language model 116 to assist it in the identification of the best path through the matrix. As a result, the decoder 112 is now able to provide a much more accurate identification of the letters spoken by the user. Indeed, the recognition engine 104 is typically able to identify the word(s) uttered by the user. After performing the backward pass, the complete letter string (i.e., the identified word) is preferably provided directly to the speech output module 136 for presentation to the user, as represented by block 280 of FIG. 2, via the speech synthesizer 144 as shown by arrow A (FIG. 1), bypassing the spelling engine 120.

Significantly, the system 100 may include a plurality of available vocabulary lists (not shown) that may be selectively drawn upon by the spelling engine 120. By directing the spelling engine 120 to draw upon a particular vocabulary list, the context in which the system 100 is being operated can be modified quickly and easily. For example, a first vocabulary list may contain a list of musical artists so that the system may be contacted by a user to purchase compact discs from a mail-order supply house. A set of other lists may comprise the titles of the recordings available by each artist of the first list. Any of these vocabulary lists may be drawn upon by the system of the present invention depending on the particular context in which the system is operating. As a result, the system is able to reduce the amount of computational power needed to understand the user while maintaining access to a large vocabulary and, importantly, operate in real time.

It should be further understood that the predefined criteria may change depending on which vocabulary list is being accessed by the spelling engine. It should be further understood that the predefined criteria may change depending on whether an end of speech has occurred.

The foregoing description has been directed to specific embodiments of this invention. It will be apparent, however, that other variations and modifications may be made to the described embodiment, with the attainment of some or all of their advantages. Therefore, it is the object of the appended claims to cover all such variations and modifications as come within the true spirit and scope of the invention. In particular, any of a number of commercial or research speech recognition engines can be used, including frame-based, segment-based and artificial intelligence-based engines.

What is claimed is:

1. A speech recognition system for recognizing a word based on a continuous spoken spelling of the word before the word has been completely spoken and as each uttered letter of the spelling is received, the system comprising:

a speech recognition engine for:
- receiving acoustic input representing one or more continuously uttered letters of at least one word;
- determining, based on the acoustic input, hypotheses for the one or more letters of the word as the letters are received; and
- periodically, before the word has been completely spoken, outputting an updated string of hypothesized letters as the hypotheses are determined, the updated string representing a partial spelling of the word or words represented by the continuous spelling; and a spelling engine operably engaged with the speech recognition engine, the spelling engine having access to a vocabulary list and including a confusability matrix representing the confusability between each hypothesized letter and each letter of each word within the vocabulary list, wherein the spelling engine:
- receives the periodically updated string of hypothesized letters representing the partial spelling as each letter is uttered; and
- compares the string to the words in the vocabulary list to obtain one word from the vocabulary list that best matches the uttered letter.

2. The system of claim 1 wherein the spelling engine further comprises an analysis module for comparing the string of hypothesized letters to the words in the vocabulary list to produce a score value that represents a likelihood of a match between the string of hypothesized letters and a vocabulary word; and wherein the spelling engine matches the string to the one vocabulary word based on the score value.

3. The system of claim 2 wherein the spelling engine further comprises a transition cost table, and wherein the spelling engine compares the string to the words in the vocabulary list to obtain a best match to a word in the vocabulary list by constructing a node grid in memory, wherein the node grid represents a comparison of the string of hypothesized letters to a vocabulary word based on the confusability matrix and the transition cost table.

4. The system of claim 3 wherein the analysis module further comprises:

means, using a dynamic programming algorithm, for analyzing the node grid and for generating the score for the vocabulary word associated with that node grid, by (a) for each row of the node grid, computing a maximum score of each of a plurality of paths through the node grid, from a start node in said row to each node in the node grid that is associated with the last hypothesized letter, and (b) selecting one of said paths that has a highest score.

5. The system of claim 3 wherein the spelling engine further comprises a scoring module for determining when a best match has been obtained between a string of letters and a vocabulary word based on the scores generated by the analysis module, based on predefined criteria that include a minimum threshold-value which a score must exceed to qualify as a best score and a minimum delta-value by which the best score must exceed a next highest score.

6. The system of claim 5 further comprising an early identification component controlled by the spelling engine, the early recognition component capable of presenting the best match vocabulary word to the user without waiting for the user to complete the spelling of the desired word.

7. The system of claim 6 wherein the early identification component comprises a database of stored speech corresponding to the words in the vocabulary list and a reply generator for presenting the best match vocabulary word from the database to the user.

8. The system of claim 1 further comprising an early identification component controlled by the spelling engine, the early recognition component capable of presenting the best match vocabulary word to the user without waiting for the user to complete the spelling of the desired word.

9. The system of claim 8 wherein the early identification component comprises a database of stored speech corresponding to the words in the vocabulary list and a reply generator for presenting the best match vocabulary word from the database to the user.

10. A method for recognizing a desired word based on a continuous spoken spelling of that word by a user before the word has been completely spoken and as each uttered letter of the spelling is received, the method comprising the steps of:

receiving one or more continuously uttered letters of the word from a user;

processing the letters into a speech signal having a format that is compatible with a speech recognition engine as each of the letters is received;

analyzing the speech signal using a speech recognition engine to determine hypotheses for the letters as they are received and to periodically output, before the word has been completely spoken, an updated string of hypothesized letters as hypotheses for the letters are determined, the updated string representing a partial spelling of the word represented by the uttered letters;

comparing the updated strings of hypothesized letters representing partial spellings to a preselected vocabulary comprising a list of words using a spelling engine as the letters are received until a best match is obtained between a given string of hypothesized letters and a single vocabulary word.

11. The method of claim 10 wherein the spelling engine further comprises a confusability matrix and a transition cost table, and the step of comparing further comprises the steps of:

constructing a node grid between the string of hypothesized letters and a vocabulary word based on the confusability matrix and the transition cost table; and calculating a best score for the node grid in which the best score relates to the likelihood of a match between the string of hypothesized letters and the vocabulary word associated with the node grid.

12. The method of claim 11 wherein the spelling engine further comprises a scoring module having predefined criteria and the step of comparing further comprises the step of contrasting the best score with the predefined criteria such that if the best score satisfies the predefined criteria then a match is recognized by the spelling engine between the string of letters and the vocabulary word associated with the node grid.

13. The method of claim 12 further comprising the step of interrupting the user to present the vocabulary word having the best score that satisfies the predefined criteria.

14. A computer-implemented method for automatically recognizing a word based on an electronic speech signal that represents a continuous spoken spelling of the word before the word has been completely spoken and as each uttered letter of the word is received, the method comprising the steps of:

receiving and processing one or more continuously uttered letters of the word into the electronic speech signal;

analyzing the electronic speech signal to determine hypotheses for one or more letters of the word as the speech signal and uttered letters are received and before the word has been completely spoken;

periodically outputting, before the word has been completely spoken, an updated string of hypothesized letters as the hypotheses are determined, the updated string representing the portion of the word;

comparing the updated string to a plurality of pre-selected vocabulary words as the letters are received until a best match is obtained between the updated string and one vocabulary word; and outputting the vocabulary word, before the word has been completely spoken, based on the best match.

* * * * *